Sept. 3, 1929.  W. E. ZINNBAUER  1,726,972
LOCK WASHER
Filed July 15, 1927
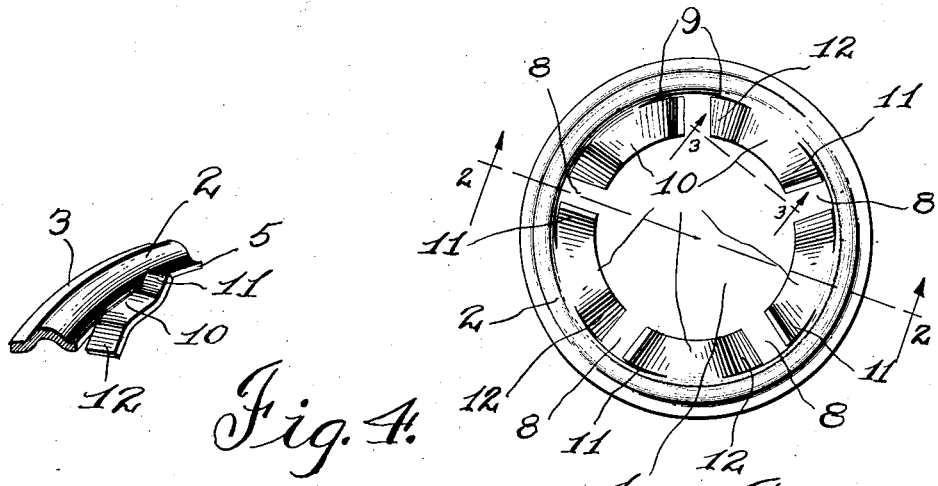
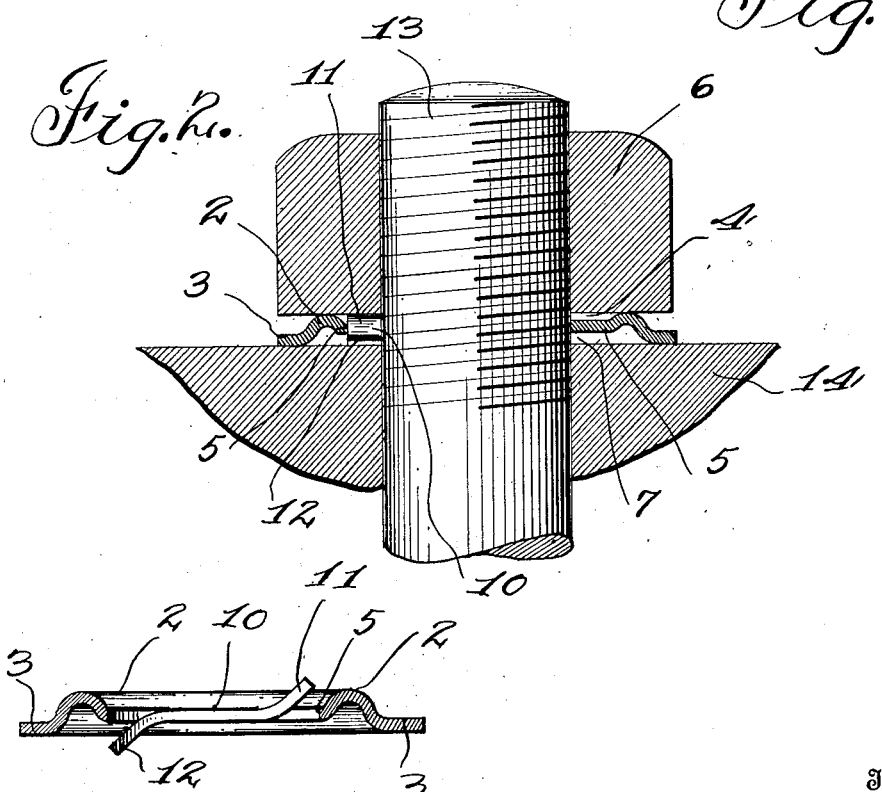
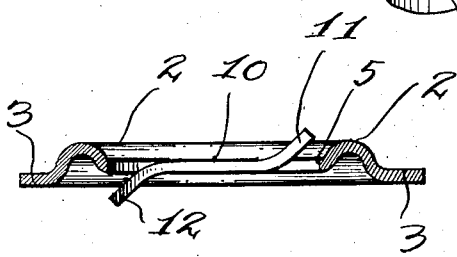
Inventor
William E. Zinnbauer Patented Sept. 3, 1929.

1,726,972

UNITED STATES PATENT OFFICE.

WILLIAM E. ZINNBAUER, OF DETROIT, MICHIGAN.

LOCK WASHER.

Application filed July 15, 1927. Serial No. 205,867.

This invention relates to lock washers and the object of the invention is to provide a lock washer having spring lugs which cannot be completely flattened by tightening of the nut with which the lock washer is utilized.

Another object of the invention is to provide a lock washer provided with spring lugs adapted to bite into the surface on which it is positioned and into the nut when the nut is tightened down thereon to prevent removal of the nut.

Another object of the invention is to provide a lock washer which limits the movement of the nut toward the washer support and in which the spring lugs maintain their resiliency at all times.

These objects and the several novel features of the invention are hereinafter more fully described and claimed and the preferred form of construction by which these objects are attained is shown in the accompanying drawings in which—

Fig. 1 is a plan view of a lock washer embodying my invention.

Fig. 2 is a section through the lock washer as mounted on a bolt or stud taken on line 2—2 of Fig. 1.

Fig. 3 is an enlarged section taken on line 3—3 of Fig. 1.

Fig. 4 is a perspective detail showing one of the spring lugs of the lock washer.

The lock washer comprises a metal disc having a central aperture 1 and an annular bead 2 formed in the metal near the outer edge. When the annular bead 2 is formed, the outer edge 3 is depressed below the portion of the washer within the bead 2, as shown in Fig. 2. In this manner a space 4 is provided between the central portion 5 of the washer and the nut 6 and a space 7 is provided between the central portion of the washer and the member on which the flange 3 of the washer rests. The inner edge of the washer about the aperture 1 is provided with five notches 8 and the washer is sheared or slitted at 9 on opposite sides of each notch 8 in the form of an arc. This provides five separate lugs 10 about the inner edge of the washer and the end 11 of each lug is turned upwardly as shown in Figs. 1 and 2 while the end 12 thereof is turned downwardly. It will be noted that the ends 11 of the lugs extend above the bead 2 of the washer while the ends 12 extend below the flange 3. The washer is tempered so that the lugs will maintain their resiliency and the lugs 10 are arcuate in form and extend about the circumference of the bolt or stud 13.

In operation the lock washer is positioned over a bolt or stud with the spring lugs in the position shown in Figs. 1 and 2. As the nut 6 is threaded down onto the bolt or stud 13 it passes over the spring ends 11 of the lugs 10 in a clockwise direction thus compressing the lugs between the nut 6 and the member 14 on which the washer is positioned. The compression of the spring lugs is limited however by the flange 3 engaging the member on which it rests and by the nut 6 engaging the bead 2 on the washer. This prevents the nut from being turned down until the lugs 10 are flattened out. In the ordinary lock washer having spring lugs of any common form and not provided with the bead 2 the tightening of the nut actually flattens the spring lugs and breaks down or crushes the lines of stress in the lugs to such an extent that when the nut is removed the lugs will not spring back to their former position. With this type of washer after the nut has been turned down tightly the washer has no more locking action than a common washer and as soon as the nut begins to loosen the spring lugs will not spring out to maintain a tension on the nut. The particular object of my invention is to prevent the crushing of the lines of stress in the spring lugs so that the spring lugs always maintain a tension on the nut to prevent its loosening. This is accomplished by means of the bead 2 and depressed flange 3 which prevents the possibility of flattening of the spring lugs when tightening up the nut. While the nut is threaded on in a clockwise direction quite readily, the upturned ends 11 of the lugs bite into the nut and the downturned ends 12 bite into the washer support so that counter clockwise rotation to remove the nut is almost impossible except when tremendous pressure is applied to the nut. Due to the fact that the spring lugs are not crushed or flattened when in use the washer may be used again after removal of the nut.

From the foregoing description it becomes evident that the device is very simple and efficient in operation, will prevent the breaking down of the spring lugs by pressure applied to the nut and provides a device which accomplishes the objects described.

Having thus fully described my invention, its utility and mode of operation, what I claim and desire to secure by Letters Patent of the United States is—

1. A lock washer comprising an annular member having an annular raised bead adjacent to and in spaced relation with its outer edge, the said outer edge about the bead being depressed below the remainder of the washer, a series of spring lugs formed in the washer within the said bead, the said spring lugs extending above the bead on one side of the washer and below the outer edge on the other side of the washer.

2. A lock washer comprising a sheet metal disk having a central aperture, the disk being provided with a raised bead on one side and a depressed flange on the opposite side, and a series of spring lugs extending from opposite sides of the washer adapted to allow turning of a nut in one direction thereover and to prevent rotation of the nut in the opposite direction.

3. A lock washer comprising a sheet metal disk having a central aperture, the disk being provided with a raised bead on one side and a depressed flange on the opposite side, a series of arcuate spring lugs formed from the metal disk about the central aperture, one end of each spring lug being turned upwardly and the opposite end being turned downwardly.

4. A lock washer comprising an annular metal member having an annular raised bead adjacent its outer periphery, the metal on the exterior of the bead being depressed below the remainder of the washer, and a series of spring lugs extending on opposite sides of the washer.

5. A lock washer comprising an annular sheet metal member having an annular raised bead adjacent to and in spaced relation with its outer edge, the said outer edge being depressed below the remainder of the washer, and a series of spring lugs formed from the metal of the washer within the said bead.

6. A lock washer comprising an annular metal member having an annular bead formed therein adjacent the periphery, a series of spring lugs formed in the annular member within said bead, the bead being arranged to prevent complete flattening of the spring lugs in use.

7. A lock washer comprising an annular member having an annular bead formed therein and a series of spring lugs extending from opposite sides of said member above and below said bead.

In testimony whereof I sign this specification.

WILLIAM E. ZINNBAUER.